(12) United States Patent
Oiwa (10) Patent No.: US 11,489,329 B2
(45) Date of Patent: Nov. 1, 2022

(54) POWER SUPPLY SYSTEM

(71) Applicant: HONDA MOTOR CO., LTD., Tokyo (JP)

(72) Inventor: Hisaya Oiwa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 16/882,766

(22) Filed: May 26, 2020

(65) Prior Publication Data

US 2020/0381916 A1 Dec. 3, 2020

(30) Foreign Application Priority Data

May 28, 2019 (JP) .............................. JP2019-099531

(51) Int. Cl.
*H02H 7/12* (2006.01)
*B60R 16/033* (2006.01)
*H02H 1/00* (2006.01)

(52) U.S. Cl.
CPC ............. *H02H 7/12* (2013.01); *B60R 16/033* (2013.01); *H02H 1/0007* (2013.01)

(58) Field of Classification Search
CPC ....... H02H 1/0007; H02H 7/12; B60R 16/033
USPC ...................................................... 361/93.1
See application file for complete search history.

(56) References Cited

U.S. PATENT DOCUMENTS

2016/0276823 A1* 9/2016 Himeno ................. H02J 7/1423
2019/0299804 A1* 10/2019 Oyama ............. H02M 7/53875
2019/0299809 A1* 10/2019 Oyama ................. B60L 15/007

FOREIGN PATENT DOCUMENTS

JP 2017169311 A 9/2017

* cited by examiner

*Primary Examiner* — Yemane Mehari
(74) *Attorney, Agent, or Firm* — CKC & Partners Co., LLC (57) ABSTRACT

A power supply system includes: a first power circuit having a first battery, a second power circuit having a second battery, a voltage converter which converter voltage between the first power circuit and second power circuit, a current sensor which acquires a passing current value Iact of the voltage converter, a passing power control unit which operates the voltage converter, and a failure determination unit which determines failure of the voltage converter. The failure determination unit determines that the voltage converter has failed in a case of the passing current value Iact becoming negative in a state in which the passing power control unit is not operating the high-arm element of the voltage converter to ON, and makes a time from when the passing current value Iact first became negative until determining that the voltage converter failed shorter as the passing current value Iact increases to the negative side.

8 Claims, 6 Drawing Sheets

POWER SUPPLY SYSTEM

This application is based on and claims the benefit of priority from Japanese Patent Application No. 2019-99531, filed on 28 May 2019, the content of which is incorporated herein by reference.

BACKGROUND OF THE INVENTION

Field of the Invention

The present invention relates to a power supply system. In more detail, it relates to a power supply system equipped with a first circuit having a first power source, a second circuit having a second power source, and a voltage converter which converts the voltage between these first and second circuits.

Related Art

In recent years, the development has been active of electric vehicles such as electric transport equipment equipped with a drive motor as a power generation source, and hybrid vehicles equipped with a drive motor and internal combustion engine as power generation sources. In such electric vehicles, a power supply device such as a capacitor (battery, etc.) and fuel cell for supplying electrical energy to the drive motor is also built in. In addition, in recent years, a vehicle equipped with a plurality of power supply devices having different characteristics in an electric vehicle has also been developed.

Japanese Unexamined Patent Application, Publication No. 2017-169311 shows a power supply system of an electric vehicle which includes a power circuit connecting a first capacitor and a drive unit configured from a drive motor, inverter, etc.; a second capacitor connected via this power circuit and a voltage converter, and a controller which performs switching control on this voltage converter. The controller sets the target current for the passing current, which is the electrical current passing through the voltage converter according to a demand from the driver, as well as performing switching control of the voltage converter so that the passing current becomes the target current to synthesize the electric power outputted from the first capacitor and the electric power outputted from the second capacitor.

In addition, as in the power supply system of Japanese Unexamined Patent Application, Publication No. 2017-169311, in the case of connecting two power supply devices by a voltage converter, if the voltage converter fails, there are cases where passing current of unintended direction and magnitude will flow. Therefore, with the power supply system of Japanese Unexamined Patent. Application, Publication No. 2017-169311, during execution of switching control of the voltage converter by the controller, in the case of a shift arising between the target current and passing current detected by a current sensor, the voltage converter is determined as having failed.

SUMMARY OF THE INVENTION

With the power supply system of Japanese Unexamined Patent Application, Publication No. 2017-169311, since determining failure of the voltage converter based on the shift between the passing current and target current in this way, it is not possible to determine a failure until activating the power supply system, and then starting the switching control of a voltage converter. For this reason, with the power supply system of Japanese Unexamined Patent Application, Publication No. 2017-169311, it may take time to determine that the voltage converter failed after activating the power supply system.

The present invention has an object of providing a power supply system which can quickly determine failure of a voltage converter.

A power supply system (for example, the power supply system 1 described later) according to a first aspect of the present invention includes: a first circuit (for example, the first power circuit 2 described later) having a first power source (for example, the first battery B1 described later); a second circuit (for example, the second power circuit 3 described later) having a second power source (for example, the second battery B2 described later); a voltage converter (for example, the voltage converter 5 described later) which converts voltage between the first circuit and the second circuit; a power converter (for example, the power converter 43 described later) which converts electric power between the first circuit and a drive motor (for example, the drive motor M described later); a current sensor (for example, the current sensor 33 described later) which acquires a passing current value, which is an electrical current value of the voltage converter defining a direction of flow from the second circuit side to the first circuit side as positive; a control unit (for example, the passing current control unit 73a described later) which operates the voltage converter; and a failure determination unit (for example, the failure determination unit 73b described later) which determines failure of the voltage converter based on the passing current value, in which the failure determination unit determines that the voltage converter has failed in a case of the passing current value becoming negative in a state in which the control unit is not operating a high-arm side switching element (for example, the high-arm element 53H described later) of the voltage converter to an ON state; and shortens a time from when the passing current value first becomes negative until determining that the voltage converter failed, as the passing current value increases to a negative side.

According to a second aspect of the present invention, in this case, it is preferable for the failure determination unit to determine that the voltage converter failed in a case of a time integrated value (for example, the integrated value S described later) of a value obtained by multiplying a weighting factor (for example, the weighting factor w described later) of a predetermined value by the passing current value reaching a predetermined threshold (for example, the threshold Sth described later).

According to a third aspect of the present invention, in this case, it is preferable for the power supply system to further include: a first electrical component (for example, the reactor L described later) and a second electrical component (for example, the contactors 32p, 32n described later) which are provided to the second circuit or the voltage converter; and a protection device (for example, the failure determination unit 73b and second battery ECU 75 described later) which configures so that electrical current does not flow to the first electrical component and the second electrical component, in a case of the failure determination unit determining that the voltage converter failed.

According to a fourth aspect of the present invention, in this case, it is preferable for the power supply system to further include: a first electrical component (for example, the reactor L described later) and a second electrical component (for example, the contactors 32p, 32n described later) which are provided to the second circuit or the voltage converter; and a protection device (for example, the failure determination unit 73b and second battery ECU 75 described later) which configures so that electrical current does not flow to the first electrical component and the second electrical component, in a case of the failure determination unit determining that the voltage converter failed, in which the failure determination unit sets the value of the weighting factor so as to determine that the voltage converter failed before any of the first electrical component and the second electrical component fail.

According to a fifth aspect of the present invention, in this case, it is preferable for the failure determination unit to estimate a future temperature of each of the first electrical component and the second electrical component based on the passing current value, a first time which is a time in which the future temperature of the first electrical component exceeds a protection temperature thereof, and a second time which is a time in which the future temperature of the second electrical component exceeds a protection temperature thereof; to set the value of the weighting factor by searching a first map set according to a characteristic of the first electrical component based on the passing current value in a case of the first time being earlier than the second time; and to set the value of the weighting factor by searching a second map set according to a characteristic of the second electrical component based on the passing current value, in a case of the second time being earlier than the first time.

The power supply system according to the first aspect of the present invention connects the first circuit having the first power source and the second circuit having the second power source by the voltage converter. In such a power supply system, there are cases where, when the high-arm side switching element, which is a switching element that connects cathode side of the first circuit and cathode side of the second circuit in the voltage converter, fails ON, negative passing current may flow from the first circuit side to the second circuit side, even if being a state of not operating this high-arm side switching element to ON. In the present invention using this, the failure determination unit determines that the voltage converter failed, in a case of the passing current value becoming negative in a state in which the control unit is not operating the high-arm side switching element of the voltage converter to ON. Consequently, according to the present invention, it is possible to quickly determine failure of the voltage converter immediately after starting up the power supply system, i.e. prior to starting the ON/OFF operation of the switching element of the voltage converter by the control unit.

In addition, if the high-arm side switching element of the voltage converter fails ON, and large passing current continuously flows from the first circuit side to the second circuit side, various electrical components provided to the voltage converter and second circuit generate heat, and may fail. Therefore, the failure determination unit makes the time from when the passing current value first becomes negative until determining that the voltage converter failed to be shorter as the passing current value increases to the negative side. In other words, the failure determination unit makes the time from when the passing current value first becomes negative until determining that the voltage converter failed to be longer as the passing current value decreases to the negative side. Since it is thereby possible to quickly determine that the voltage converter failed in the case of a large passing current flowing from the first circuit side to the second circuit side, before the various electrical components provided to the voltage converter and second circuit fail, it is possible to execute protection processing for protecting these. In addition, according to the present invention, in the case of the passing current being relatively small and the electrical components failing immediately being low, since it is possible to secure sufficient time from when the passing current value first becomes negative until determining that the voltage converter failed, misjudgment can be prevented.

In the second aspect of the present invention, the failure determination unit determines that the voltage converter failed in the case of the integrated value of time of a value obtained by multiplying the weighting factor by the passing current value reaching a predetermined threshold. It is thereby possible to quickly determine that the voltage converter failed so that the various electrical components will not fail, in a case of the passing current flowing from the first circuit side to the second circuit side being large, and it is possible to ensure sufficient determination time so as to be able to prevent misjudgment in the case of the passing current flowing from the first circuit side to the second circuit side being small.

In the second aspect of the present invention, the protection device, in the case of determining that the voltage converter failed, configures so that the electrical current does not flow to the first electrical component provided to the second circuit or voltage converter. In a case of the voltage converter failing, and large passing current flowing from the first circuit side to the second circuit side, it is thereby possible to prevent this first electrical component and second electrical component from failing due to heat generation.

In the fourth aspect of the present invention, the failure determination unit sets the value of the weighting factor so as to determine that the voltage converter failed prior to any of the first electrical component and second electrical component failing. In the case of the passing current flowing from the first circuit side to the second circuit side due to the voltage converter 5 failing, it is possible to determine that the voltage converter failed prior to the first electrical component and second electrical component failing due to heat generation, and thus possible to make so that electrical current does not flow to this first electrical component and second electrical component; therefore, it is thereby possible to prevent the first electrical component and second electrical component from failing due to heat generation.

In the fifth aspect of the present invention, when the voltage converter fails, and large passing current flows from the first circuit side to the second circuit side, the first electrical component and second electrical component each generate heat due to Joule loss, and may fail; however, the time of failing differs depending on the characteristics of each electrical component and magnitude of passing current. Therefore, in the present invention, the failure determination unit, based on the passing current value, estimates the future temperatures of each of the first and second electrical components, a first time in which the future temperature of the first electrical component exceeds the protection temperature thereof, and a second time in which the future temperature of the second electrical component exceeds a protection temperature thereof. Then, the failure determination unit, in a case of the first time being earlier than the second time, i.e. case of estimating that the first electrical component will fail earlier than the second electrical component, sets the value of the weighting factor based on a first map set according to characteristics of the first electrical component, and in a case of the second time being earlier than the first time, i.e. case of estimating that the second electrical component will fail earlier than the first electrical component, sets the value of the weighting factor based on a second map set according to characteristics of the second electrical component. The present invention can thereby adjust the time of determining that the voltage converter failed to match the characteristic of the one estimated as failing earlier among the first and second electrical components; therefore, it is possible to determine that the voltage converter failed before any first and second electrical components fails, and thus possible to prevent electrical current from flowing to these first and second electrical components.

DETAILED DESCRIPTION OF THE INVENTION

Figure 1:
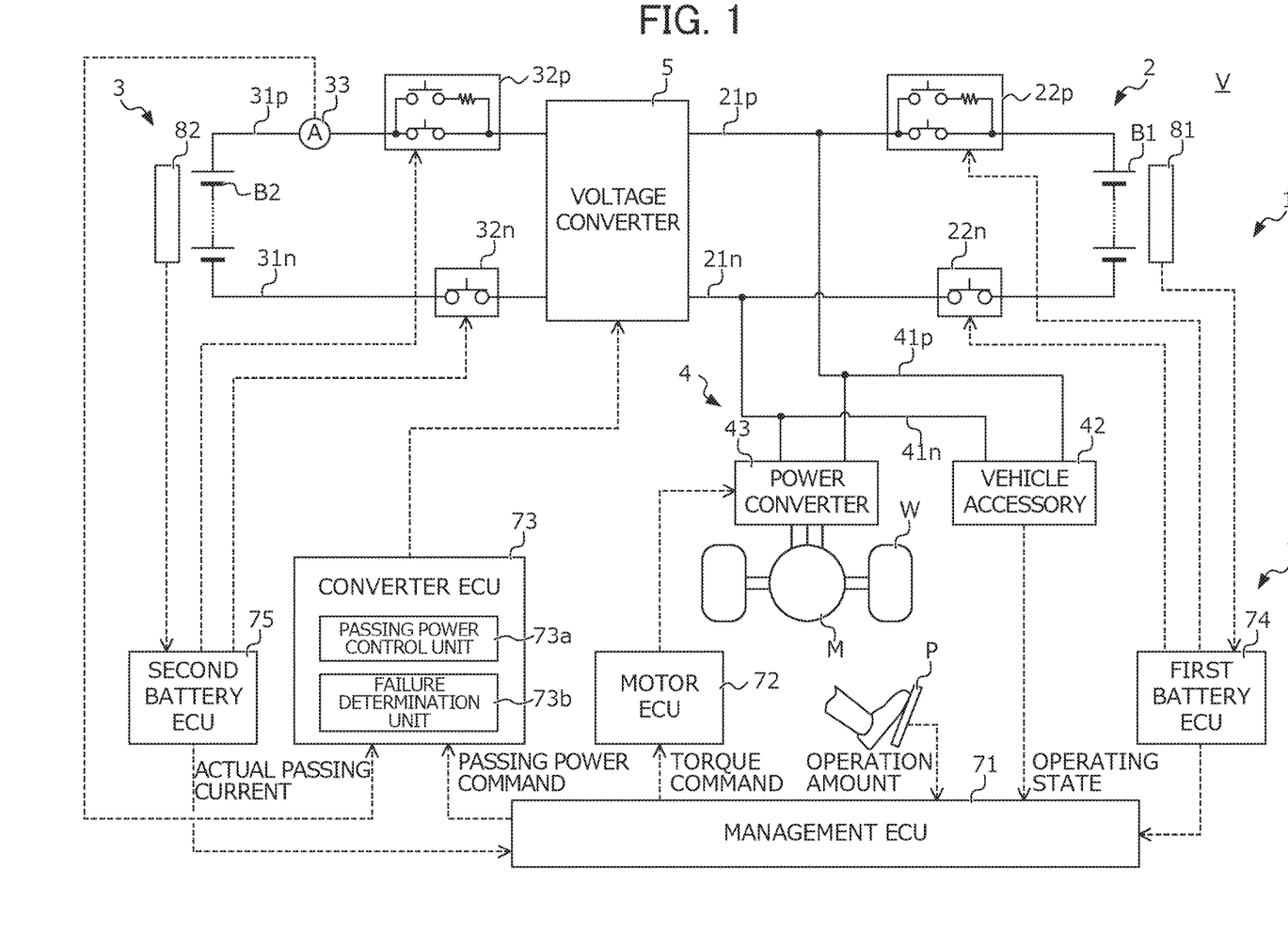
FIG. 1 is a view showing the configuration of a vehicle equipped with a power supply system according to an embodiment of the present invention.

Hereinafter, an embodiment of the present invention will be explained while referencing the drawings. FIG. 1 is a view showing the configuration of an electric vehicle V (hereinafter simply referred as "vehicle") equipped with a power supply system 1 according to the present embodiment.

The vehicle V includes: a drive wheel W; a drive motor M coupled to this drive wheel W; and a power supply system 1 which performs transfer of electric power between this drive motor M and the first battery B1 and second battery B2 described later. It should be noted that the present embodiment explains an example in which the vehicle V accelerates/decelerates by the electric power generated by the drive motor M mainly; however, the present invention is not limited thereto. The vehicle V may be established as a so-called hybrid vehicle equipped with the drive motor M and an engine as power generation sources. In addition, the present embodiment explains as an example the power supply system 1 which travels by supplying electric power stored in the two batteries B1, B2 to the drive motor M; however, the present invention is not limited thereto. Either of the two batteries B1, B2 equipped to the power supply system 1 may be established as a fuel cell.

The drive motor M is joined to the drive wheel W via a power transmission mechanism (not shown). The torque generated by the drive motor M by supplying three-phase alternating current power to the drive motor M from the power supply system 1 is transmitted to the drive wheel W via the power transmission mechanism (not shown) to cause the drive wheel W to rotate and the vehicle V to travel. In addition, the drive motor M exhibits a function of a generator during deceleration of the vehicle V and generates regenerative electric power, as well as applying regenerative braking torque according to the magnitude of this regenerative electric power to the drive wheel W. The regenerative electric power generated by the electric motor M is appropriately charged to the batteries B1, B2 of the power supply system 1.

The power supply system 1 includes: a first power circuit 2 having a first battery B1, a second power circuit 3 having a second battery B2, a voltage converter 5 which connects this first power circuit 2 and second power circuit 3, a load circuit 4 having various electrical loads including the drive motor M, and an electronic control unit group 7 which controls these power circuits 2, 3, 4 and voltage converter 5. The electronic control unit group 7 includes a management ECU 71, a motor ECU 72, a converter ECU 73, a first battery ECU 74, and a second battery ECU 75, which are each a computer.

The first battery B1 is a secondary battery capable of both discharging which converts chemical energy into electrical energy, and charging which converts the electrical energy into chemical energy. Hereinafter, a case is explained using a so-called lithium-ion battery which performs charging/discharging by the lithium ion migrating between electrodes as this first battery B1; however, the present invention is not limited thereto.

A first battery sensor unit 81 for estimating the internal state of the first battery B1 is provided to the first battery B1. The first battery sensor unit 81 detects a physical quantity required in order to acquire the charging rate of the battery B1 (value expressing the charged amount of the battery by percentage), the temperature, etc. in the first battery ECU 74, and is configured by a plurality of sensors which send signals according to the detection value to the first battery ECU 74. More specifically, the first battery sensor unit 81 is configured by a voltage sensor that detects the terminal voltage of the first battery B1, a current sensor that detects the electrical current flowing in the first battery B1, a temperature sensor that detects the temperature of the first battery B1, etc.

The second battery B2 is a secondary battery capable of both discharging that converts chemical energy into electrical energy, and charging that converts electrical energy into chemical energy. Hereinafter, a case is explained using a so-called lithium-ion battery which performs charging/discharging by the lithium ion migrating between electrodes as this second battery B2; however, the present invention is not limited thereto. The second battery B2 may use capacitors, for example.

A second battery sensor unit 82 for estimating the internal state of the second battery B2 is provided to the second battery B2. The second battery sensor unit 82 detects a physical quantity required for acquiring the charge rate, temperature, etc. of the second battery B2 in the second battery ECU 74, and is configured by a plurality of sensors which send signals according to the detection value to the second battery ECU 75. More specifically, the second battery sensor unit 82 is configured by a voltage sensor that detects terminal voltage of the second battery B2, a current sensor that detects the electrical current flowing in the second battery B2, a temperature sensor that detects the temperature of the second battery B2, etc.

Herein, the characteristics of the first battery B1 and the characteristics of the second battery B2 are compared. The first battery B1 has lower output weight density and higher energy weight density than the second battery B2. In addition, the first battery B1 has larger capacity than the second battery B2. In other words, the first battery B1 is superior to the second battery B2 in the point of energy weight density. It should be noted that energy weight density is the electric energy per unit weight (Wh/kg), and the output weight density is the power per unit weight (W/kg). Therefore, the first battery B1 which excels in the energy weight density is a capacitive battery with the main object of high capacity and the second battery B2 which excels in output weight density is an output-type battery with the main object of high output. For this reason, the power supply system 1 uses the first battery B1 as the main power source, and uses the second battery B2 as an auxiliary power source which supplements the first battery B1.

Figure 2:
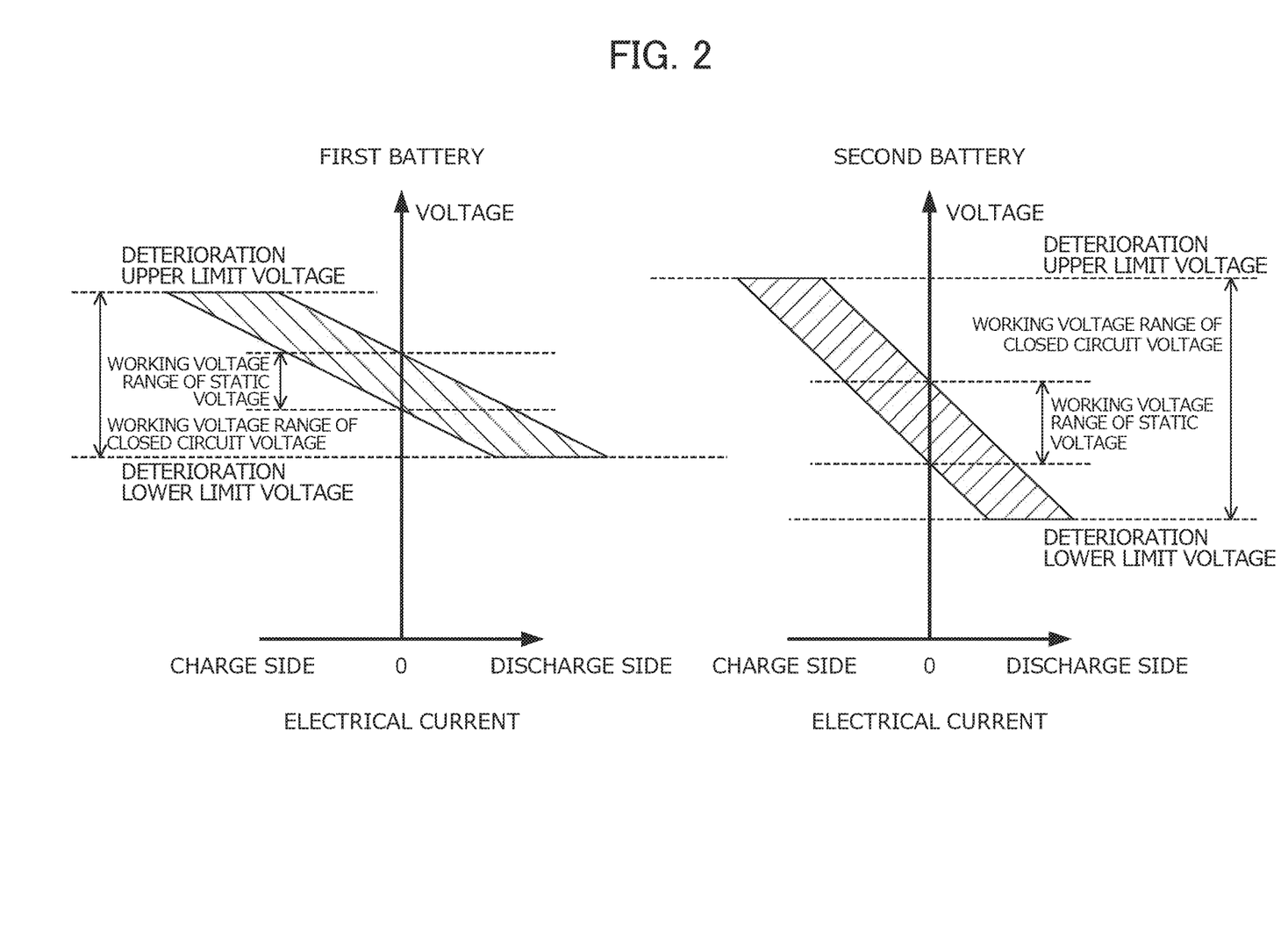
FIG. 2 provides graphs comparing the used voltage ranges of a first battery and a second battery.

FIG. 2 provides graphs comparing the used voltage range of the first battery B1 and second battery B2 in the power supply system 1. In FIG. 2, the left side is a graph showing the used voltage range of the first battery B1, and the right side is a graph showing the used voltage range of the second battery B2. In FIG. 2, the horizontal axis shows the electrical current flowing in the battery, and the vertical axis shows the voltage of the battery.

As shown in FIG. 2, the static voltage of the batteries B1, B2 (i.e. voltage in a state in which electrical current is not flowing to the battery, referred to as open circuit voltage) has a characteristic of rising with higher charge rate. Therefore, the upper limit of the used voltage range relative to the static voltage of the batteries B1, B2 is the static voltage of each when the charge rate is the maximum value (e.g., 100%), and the lower limit is the static voltage of each when the charge rate is the minimum value (e.g., 0%). As shown in FIG. 2, the upper limit of the use voltage range relative to the static voltage of the second battery B2 is lower than the upper limit of the use voltage range relative to static voltage of the first battery B1. For this reason, the static voltage of the second battery B2 during travel of the vehicle V is basically maintained lower than the static voltage of the first battery B1.

As shown in FIG. 2, the closed circuit voltages of the batteries B1, B2 (i.e. voltage in a state in which electrical current is flowing to the battery) also have a characteristic of rising as the charge rate increases. In addition, since an internal resistance exists in the batteries B1, B2, this closed circuit voltage lowers from the static voltage as the discharge current increases, and rises from the static voltage as the charge current increases. Therefore, the upper limit of the used voltage range relative to the closed circuit voltage of the batteries B1, B2 is higher than the upper limit of the used voltage range relative to the static voltage of each, and the lower limit becomes lower than the lower limit of the used voltage range relative to the static voltage of each. In other words, the used voltage range relative to the closed circuit voltage of the batteries B1, B2 includes the used voltage range relative to the static voltage of each. As shown in FIG. 2, the used voltage range relative to the closed circuit voltage of the first battery B1 overlaps the used voltage range relative to the closed circuit voltage of the second battery B2.

In addition, since the deterioration of the batteries B1, B2 is accelerated when the charging current becomes too large, the upper limit of the used voltage range relative to the closed circuit voltage of these batteries B1, B2 is decided so that these batteries B1, B2 do not deteriorate. Hereinafter, the upper limit of the use range of the closed circuit voltage of these batteries B1, B2 is also referred to as deterioration upper limit voltage.

In addition, when the discharge current becomes too large, since deterioration of the batteries B1, B2 is accelerated, the lower limit of the used voltage range relative to the closed circuit voltage of these batteries B1, B2 is decided so that these batteries B1, B2 do not deteriorate. Hereinafter, the lower limit of the used voltage range relative to the closed circuit voltage of these batteries B1, B2 is also referred to as deterioration lower limit voltage.

Referring back to FIG. 1, the first output circuit 2 includes: the first battery B1, first power lines 21p, 21n which connect both positive and negative poles of this first battery B1 and the positive terminal and negative terminal on the high-voltage side of the voltage converter 5, and a positive contactor 22p and negative contactor 22n provided to these first power lines 21p, 21n.

The contactors 22p, 22n are normal open type which opens in a state in which a command signal from outside is not being inputted and breaks conduction between both electrodes of the first battery B1 and the first power lines 21p, 21n; and closes in a state in which a command signal is being inputted and connects the first battery B1 and first power lines 21p, 21n. These contactors 22p, 22n open/close according to a command signal transmitted from the first battery ECU 74. It should be noted that the positive contactor 22p is a pre-charge contactor having a precharge resistance for mitigating the inrush current to a plurality of smoothing capacitors provided to the first power circuit 2, load circuit 4, etc.

The second power circuit 3 includes: the second battery B2, second power lines 31p, 32n which connect both positive and negative poles of this second battery B2 and the positive terminal and negative terminal on the low-voltage side of the voltage converter 5, a positive contactor 32p and negative contactor 32n provided to these second power lines 31p, 31n, and a current sensor 33 provided to the second power line 31p.

The contactors 32p, 32n are normal-open type which open in a state in which a command signal from outside is not being inputted to break conduction between both electrodes of the second battery B2 and the second power lines 31p, 31n, and close in a state in which a command signal is being inputted to connect between the second battery B2 and the second power lines 31p, 31n. These contactors 32p, 32n open/close in response to a command signal transmitted from the second battery ECU 75. It should be noted that the cathode contactor 32p is a pre-charge contactor having a pre-charge resistance for mitigating the inrush current to a plurality of smoothing capacitors provided to the first power circuit 2, load circuit 4, etc.

The electric current sensor 33 sends a detection signal according to a value of passing current, which is the electrical current flowing through the second power line 31p, i.e. electrical current flowing through the voltage converter 5, to the converter ECU 73. It should be noted that, in the present embodiment, the direction of passing current defines from the second power circuit 3 side to the first power circuit 2 side as positive, and defines from the first power circuit 2 side to the second power circuit 3 side as negative.

The load circuit 4 includes: a vehicle accessory 42, output converter 43 to which the drive motor M is connected, and load power lines 41p, 41n which connect this vehicle accessory 42 and output converter 43 with the first power circuit 2.

The vehicle accessory 42 is configured by a plurality of electrical loads such as a battery heater, air compressor, DC/DC converter, and onboard charger. The vehicle accessory 42 is connected to the first power lines 21p, 21n of the first power circuit 2 by the load power lines 41p, 41n, and operates by consuming the electric power of the first power lines 21p, 21n. The information related to the operating state of various electrical loads constituting the vehicle accessory 42 is sent to the management ECU 71, for example.

The power converter 43 is connected to the first power lines 21p, 21n so as to be parallel with the vehicle accessory 42, by the load power lines 41p, 41n. The power converter 43 converts the electric power between the first power lines 21p, 21n and the drive motor M. The power converter 43, for example, is a PWM inverter according to pulse width modulation, provided with a bridge circuit configured by bridge connecting a plurality of switching elements (e.g., IGBT), and is equipped with a function of converting between DC power and AC power. The power converter 43 is connected to the first power lines 21p, 21n on the DC I/O side thereof, and is connected to each coil of the U phase, V phase and W phase of the drive motor M at the AC I/O side thereof. The power converter 43 converts the AC power of the first power lines 21p, 21n into three-phase AC power and supplies to the drive motor M, by ON/OFF driving the switching elements of each phase in accordance with a gate drive signal generated at a predetermined timing from a gate drive circuit (not shown) of the motor ECU 72, and converts the three-phase AC power supplied from the drive motor M into DC power and supplies to the first power lines 21p, 21n.

The voltage converter 5 connects the first power circuit 2 and second power circuit 3, and converts the voltage between both circuits 2, 3. A known boost circuit is used in this voltage converter 5.

Figure 3:
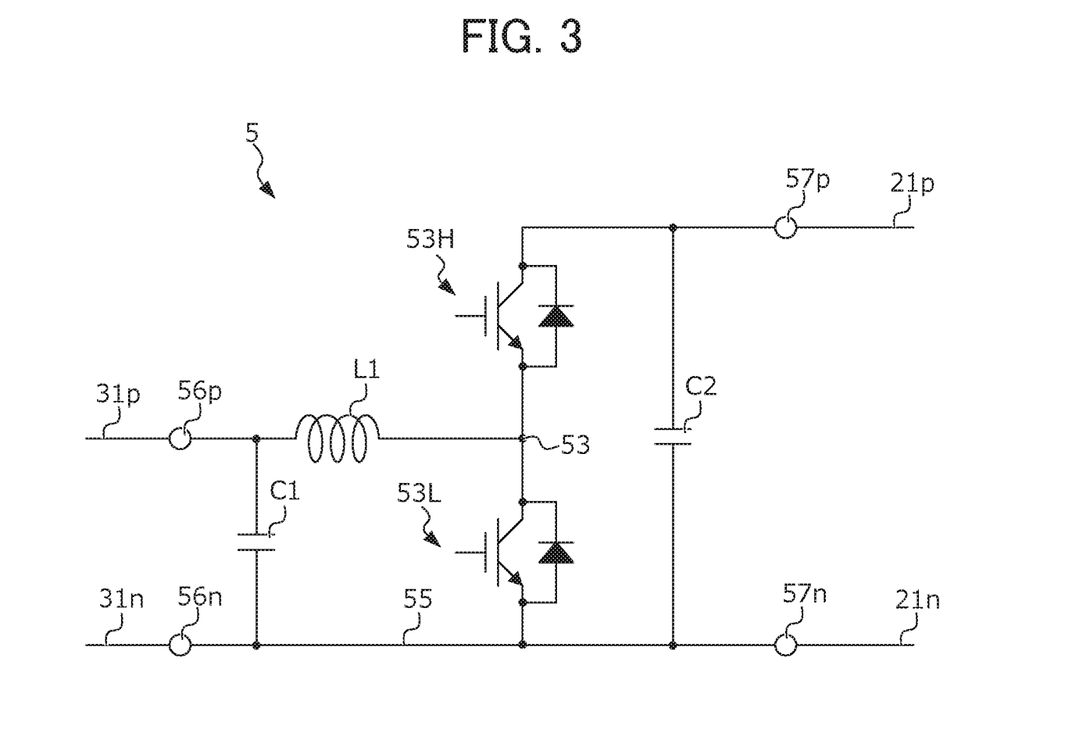
FIG. 3 is a view showing an example of the circuit configuration of a voltage converter.

FIG. 3 is a view showing an example of the circuit configuration of the voltage converter 5. The voltage converter 5 connects the first power lines 21p, 21n to which the first battery B1 is connected, and the second power lines 31p, 31n to which the second battery B2 is connected, and converts the voltage between these first power lines 21p, 21n and second power lines 31p, 31n. The voltage converter 5 is a DC/DC converter configured by combining a first smoothing capacitor C1, second smoothing capacitor C2, high-arm element 53H, low-arm element 53L, negative bus 55, low-voltage side terminals 56p, 56n, and high-voltage side terminals 57p, 57n.

The low-voltage side terminals 56p, 56n are connected to the second power lines 31p, 31n, and the high-voltage side terminals 57p, 57n are connected to the first power line 21p, 21n. The negative bus 55 is wiring connecting the low-voltage side terminal 56n and high-voltage side terminal 57n.

A reactor L has one end side thereof connected to the low-voltage side terminal 56p, and the other end side connected to a connection node 53 between the high-arm element 53H and low-arm element 53L. The first smoothing capacitor C1 has one end side thereof connected to the low-voltage side terminal 56p, and the other end side connected to the low-voltage side terminal 56n. The second smoothing capacitor C2 has one end side thereof connected to the high-voltage side terminal 57p, and the other end side thereof connected to the high-voltage side terminal 57n.

The high-arm element 53H and low-arm element 53L each include a well-known power switching element such as IGBT or MOSFET, and a freewheeling diode connected to this power switching element. This high-arm element 53H and low-arm element 53L are connected in this order in series between the high-voltage side terminal 57p and negative bus 55.

A collector of the power switching element of the high-arm element 53H is connected to the high-voltage side terminal 57p, and the emitter thereof is connected to the collector of the low-arm element 53L. The emitter of the power switching element of the low-arm element 53L is connected to the negative bus 55. The forward direction of the freewheeling diode provided to the high-arm element 53H is a direction from the reactor L towards the high-voltage side terminal 57p. In addition, the forward direction of the freewheeling diode provided to the low-arm element 53L is a direction from the negative bus 55 towards the reactor L.

The voltage converter 5 converts the voltage between the first power lines 21p, 21n and the second power lines 31p, 31n, by alternately driving ON/OFF the high-arm element 53H and low-arm element 53L, following the gate drive signal generated at a predetermined timing from a gate drive circuit (not shown) of the converter ECU 73.

As explained by referencing FIG. 2, the static voltage of the second battery B2 during travel of the vehicle V is basically maintained lower than the static voltage of the first battery B1. Therefore, the voltage of the first power lines 21p, 21n is basically higher than the voltage of the second power lines 31p, 31n. Therefore, the converter ECU 73, in a case of driving the drive motor M using both the power outputted from the first battery B1 and the power outputted from the second battery B2, operates the voltage converter 5 so that a boost function is exhibited in the voltage converter 5. Boost function refers to a function of stepping up the power of the second power lines 31p, 31n to which the low-voltage side terminals 56p, 56n are connected, and outputting to the first power lines 21p, 21n to which the high-voltage side terminals 57p, 57n are connected, whereby positive passing current flows from the second power lines 31p, 31n side to the first power lines 21p, 21n side. In addition, in the case of suppressing discharge of the second battery B2, and driving the drive motor M with only the power outputted from the first battery B1, the converter ECU 73 is configured so as to turn OFF the voltage converter 5, and make so that electrical current does not flow from the first power lines 21p, 21n to the second power lines 31p, 31n. However, in this case, in the case of the voltage of the second power lines 31p, 31n becoming higher than the voltage of the first power lines 21p, 21n, the second battery B2 turns to discharge, and positive passing current may flow from the second power lines 31p, 31n to the first power lines 21p, 21n via the freewheeling diode of the high-arm element 53H.

In addition, in the case of charging the first battery B1 or second battery B2 by the regenerative electric power outputted from the drive motor M to the first power lines 21p, 21n during deceleration, the converter ECU 73 operates the voltage converter 5 so as to exhibit a step-down function in the voltage converter 5. Step-down function refers to a function of stepping down the electric power in the first power lines 21p, 21n to which the high-voltage side terminals 57p, 57n are connected, and outputting to the second power lines 31p, 31n to which the low-voltage side terminals 56p, 56n are connected, whereby negative passing current flows from the first power lines 21p, 21n side to the second power lines 31p, 31n side. In addition, in a case of the voltage converter 5 failing in a state in which the voltage on the first power lines 21p, 21n side is higher than the voltage on the second power line 31p, 31n side, more specifically, a state of the high-arm element 54H failing ON, negative passing current flows from the first power line 21p, 21n side to the second power line 31p, 31n side.

Referring back to FIG. 1, the first battery ECU 74 is a computer mainly handling state monitoring of the first battery B1 and the ON/OFF operation of the contactors 22p, 22n of the first power circuit 2. The first battery ECU 74, based on a known algorithm using the detection value sent from the first battery sensor unit 81, calculates various parameters representing the internal state of the first battery B1, more specifically, the temperature of the first battery B1, internal resistance of the first battery B1, static voltage of the first battery B1, open-circuit voltage of the first battery B1, charge rate of the first battery B1, etc. The information related to the parameters representing the internal state of the first battery B1 acquired in the first battery ECU 74 is sent to the management ECU 71, for example.

The second battery ECU 75 is a computer mainly handling state monitoring of the second battery B2 and open/close operation of the contactors 32p, 32n of the second power circuit 3. The second battery ECU 75, based on a known algorithm using the detection value sent from the second battery sensor unit 82, calculates various parameters representing the internal state of the second battery B2, more specifically, the temperature of the second battery B2, internal resistance of the second battery B2, static voltage of the second battery B2, closed-circuit voltage of the second battery B2, charge rate of the second battery B2, etc. The information related to the parameters representing the internal state of the second battery B2 acquired in the second battery ECU 74 is sent to the management ECU 71, for example.

The management ECU 71 is a computer managing mainly the flow of electric power in the overall power supply system 1. The management ECU 71 generates, according to the following sequence, a torque command signal corresponding to a command related to the torque generated by the drive motor M, and a passing power command signal corresponding to a command related to electric power passing through the voltage converter 5.

The management ECU 71, based on the operation amount of pedals such as the accelerator pedal and brake pedal by the driver, calculates the demanded drive torque by the driver, and sends a torque command signal according to this demanded drive torque to the motor ECU 72.

The management ECU 71 calculates a total demanded power, which is the electric power demanded in the load circuit 4 overall, by summing the demanded accessory power, which is the electric power demanded in the vehicle accessory 42, and the demanded drive power, which is the electric power demanded in the drive motor M. Herein, the demanded accessory power is calculated in the management ECU 71, based on information related to the operating state of various electrical loads sent from the vehicle accessory 42. In addition, the demanded drive power is calculated in the management ECU 71, by converting the aforementioned demanded drive torque into electric power.

The management ECU 71 calculates a second load rate corresponding to a proportion of electric power outputted from the second battery B2 relative to the total demanded power, using information related to the internal state of the first battery B1 sent from the first battery ECU 74, information related to the internal state of the second battery B2 sent from the second battery ECU 75, and the aforementioned demanded drive power. In addition, the management ECU 71 calculates the second target power, which is the target relative to the electric power outputted from the second battery B2 by multiplying the second load rate calculated in the above way by the total demanded power, and sends the passing power command signal according to this second target power to the converter ECU 73.

The motor ECU 72 is a computer that mainly manages the flow of electric power from the first power circuit 2 to the drive motor M. The motor ECU 72, based on the torque command signal sent from the management ECU 71, operates the power converter 43 so that a torque according to this command is generated in the drive motor M. The electric power according to the demanded drive power is thereby supplied from the first power circuit 2 to the drive motor M.

The converter ECU 73 is a computer configured by a passing power control unit 73a that is a control module handling management of electric power passing through the voltage converter 5; and a failure determination unit 73b that is a control module which determines failure of the voltage converter 5.

The passing power control unit 73a, in response to a passing power command signal sent from the management ECU 71, operates the high-arm element 53H and low-arm element 53L of the voltage converter 5 by way of PWM control, so that the passing power according to a command passes through the voltage converter 5. More specifically, the passing power control unit 73a, based on the passing power command signal, calculates the target current, which is the target relative to the passing current of the voltage converter 5, and decides the duty ratio in accordance with a known feedback control algorithm so that the passing current detected by the current sensor 33 becomes the target current, and inputs a gate drive signal generated under this duty ratio to the high-arm element 53H and low-arm element 53L of the voltage converter 5. The electric power according to the second target power is thereby outputted from the second battery B2 to the first power circuit 2. In addition, a deficit by subtracting the second target power from the total demanded power is outputted from the first battery B1.

The failure determination unit 73b determines failure of the voltage converter 5 based on the passing current detected by the current sensor 33. Failure of the voltage converter 5 in the present embodiment more specifically indicates that the high-arm element 53H of the voltage converter 5 failed ON. Herein, failed ON of the high-arm element 53H indicates the high-arm element 53H is maintained in the ON state, and the first power circuit 2 and second power circuit 3 are electrically connected, irrespective of the passing power control unit 73a not operating the high-arm element 53H to ON, i.e. irrespective of a gate drive signal not being inputted from the passing power control unit 73a to the high-arm element 53H.

Figure 4:
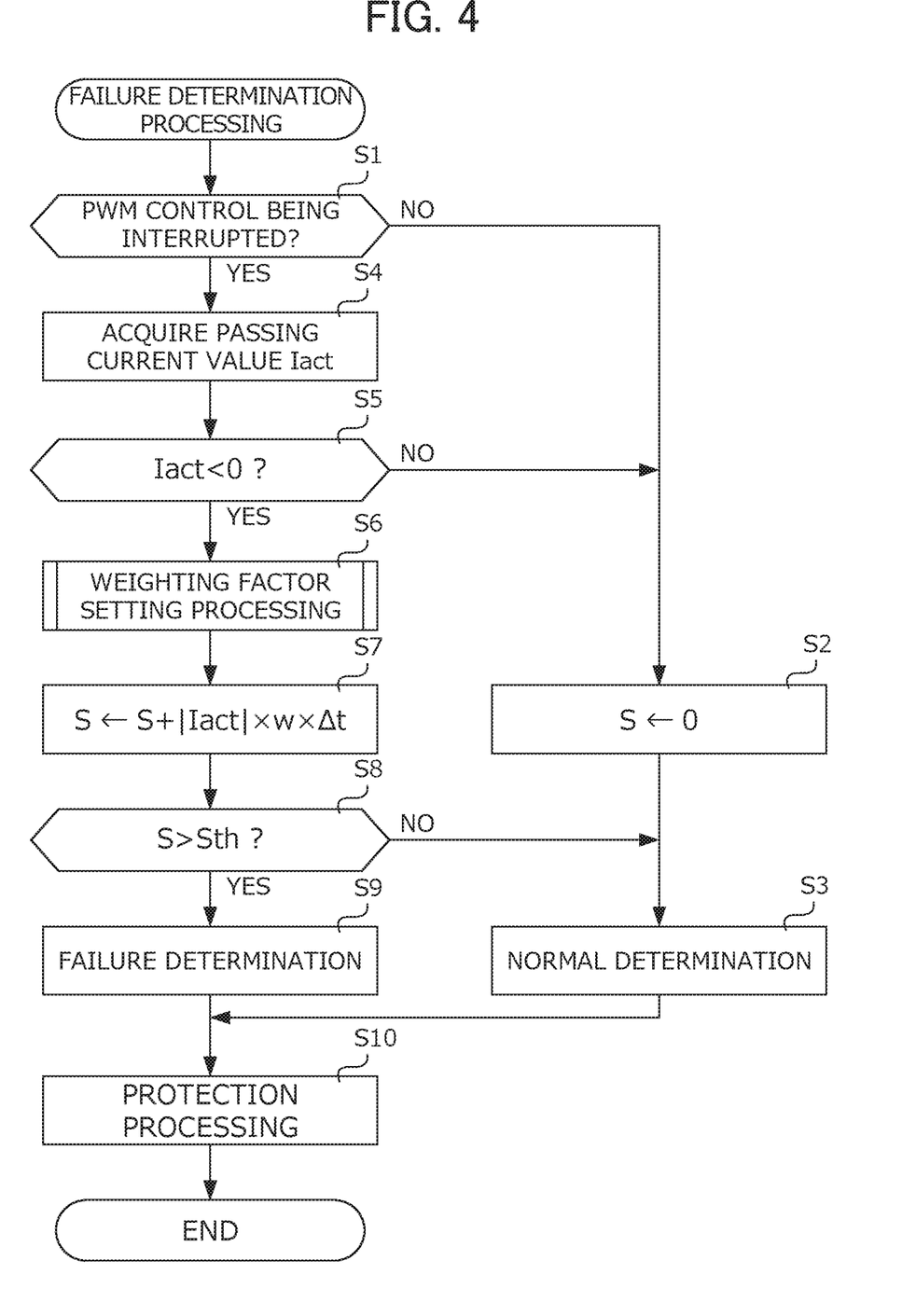
FIG. 4 is a flowchart showing the specific sequence of failure determination processing of a voltage converter.

FIG. 4 is a flowchart showing the specific sequence of failure determination processing of the voltage converter 5 in the failure determination unit 73b. The failure determination processing shown in FIG. 4 is repeatedly executed under a predetermined control cycle at by the failure determination unit 73b, until determining that the voltage converter 5 has failed.

First, in Step S1, the failure determination unit 73b determines whether the PWM control of the voltage converter 5 by the passing power control unit 73a is being stopped, in other words, whether the high-arm element 53H and low-arm element 53L are both not operated to ON by the passing power control unit 73a. In the case of the determination result of Step S1 being NO, i.e. case of being during execution of the PWM control, the failure determination unit 73b advances to Step S2. In Step S2, the failure determination unit 73b resets an integrated value S described later serving as an index for deciding the period of determining that the voltage converter 5 failed, and then advances to Step S3. In Step S3, the failure determination unit 73b determines that the voltage converter 5 is not failing, and ends the failure determination processing of FIG. 4. In the case of the determination result of Step S1 being YES, i.e. in the case of at least the high-arm element 53H not being operated to ON, the failure determination unit 73b advances to the processing of Step S4.

In Step S4, the failure determination unit 73b acquires a passing current value Iact based on the detection signal of the current sensor 33. In Step S5, it is determined whether the passing current value Iact is smaller than 0 (Iact<0?). In the case of the determination result of Step S5 being NO, i.e. in the case of passing current not flowing, or the passing electric power flowing from the second power current 3 side to the first power circuit 2 side, the failure determination unit 73b resets the integrated value S to 0 (refer to Step S2), determines the voltage converter 5 is normal (refer to Step S3), and ends the failure determination processing of FIG. 4. In addition, in the case of the determination result of Step S5 being YES, i.e. in the case of the passing current flowing from the first power circuit 2 side to the second power circuit 3 side irrespective of the high-arm element 53H not being operated ON, the failure determination unit 73b advances to Step S6.

In Step S6, the failure determination unit 73b sets the value of a weighting factor w by executing weighting factor setting processing, and advances to Step S7. Herein, weighting factor w is a factor used for weighting the passing current value Iact, upon updating the value of the integrated value S based on the passing current value Iact in the processing of Step S7 described later, and is set to a positive value. The specific sequence of this weighting-factor setting processing will be explained by referencing FIG. 5 later.

In Step S7, the failure determination unit 73b updates the integrated value S, by adding the product of the absolute value of the passing current value Iact, the value of the weighting factor w, and the control cycle Δt to the integrated value S during the previous control cycle. In other words, the integrated value S obtained by repeatedly performing calculation of this Step S7 at the cycle Δt corresponds to the time integrated value of the absolute value of the passing current value Iact weighted by the weighting factor w, from when the passing current value Iact first became negative in a state not operating the high-arm element 53H of the voltage converter 5 to ON, until the current time.

In Step S8, the failure determination unit 73b determines whether the integrated value S is greater than a predetermined positive threshold Sth (S>Sth?). In the case of the determination result of Step S8 being NO, in the case of the integrated value S not yet reaching the threshold Sth, the failure determination unit 73b determines that the voltage converter 5 is normal (refer to Step S3), and ends the failure determination processing of FIG. 4. In addition, in the case of the determination result of Step S8 being YES, i.e. the case of the integrated value S reaching the threshold Sth, the failure determination unit 73b advances to Step S9, and determines that the voltage converter 5 failed.

In Step S10, the failure determination unit 73b executes protection processing which makes so that the electric current does not flow to a specific electrical component for which protection is particularly demanded, among various electrical components provided to the second power circuit 3 and voltage converter 5. Herein, in the second power circuit 3 and voltage converter 5, specific electrical component for which protection is particularly demanded is the reactor L provided to the voltage converter 5, and contactors 32p, 32n provided to the second power circuit 3, for example. This reactor L and contactors 32p, 32n generate heat when a large passing current continuously flows from the first power circuit 2 side to the second power circuit 3 side, and there is concern over failing. Therefore, the failure determination unit 73b in this protection processing sends a command signal to the second battery ECU 75 for opening the contactors 32p, 32n. In response to receiving this command signal, the second battery ECU 75 opens the contactors 32p, 32n, and makes so that electrical current does not flow to the reactor L and contactors 32p, 32n. Therefore, in the present embodiment, a protection device is configured by the failure determination unit 73b and second battery ECU 75.

In the above way, the integrated value S is the time integrated value of the absolute value of the passing current value Iact, and thus rises more quickly as the passing current value Iact increases to the negative side. By deciding the timing at which determining that the voltage converter 5 failed using such an integrated value S, the time required from when the passing current value Iact first becomes negative (refer to Step S5), and then the integrated value S reaches the threshold (refer to Step S8), determining that the voltage converter 5 failed (refer to Step S9), and further making so that electrical current does not flow to the reactor L and contactors 32p, 32n (refer to Step S10, is made shorter as the passing current value Iact increases to the negative side, by the failure determination unit 73.

Figure 5:
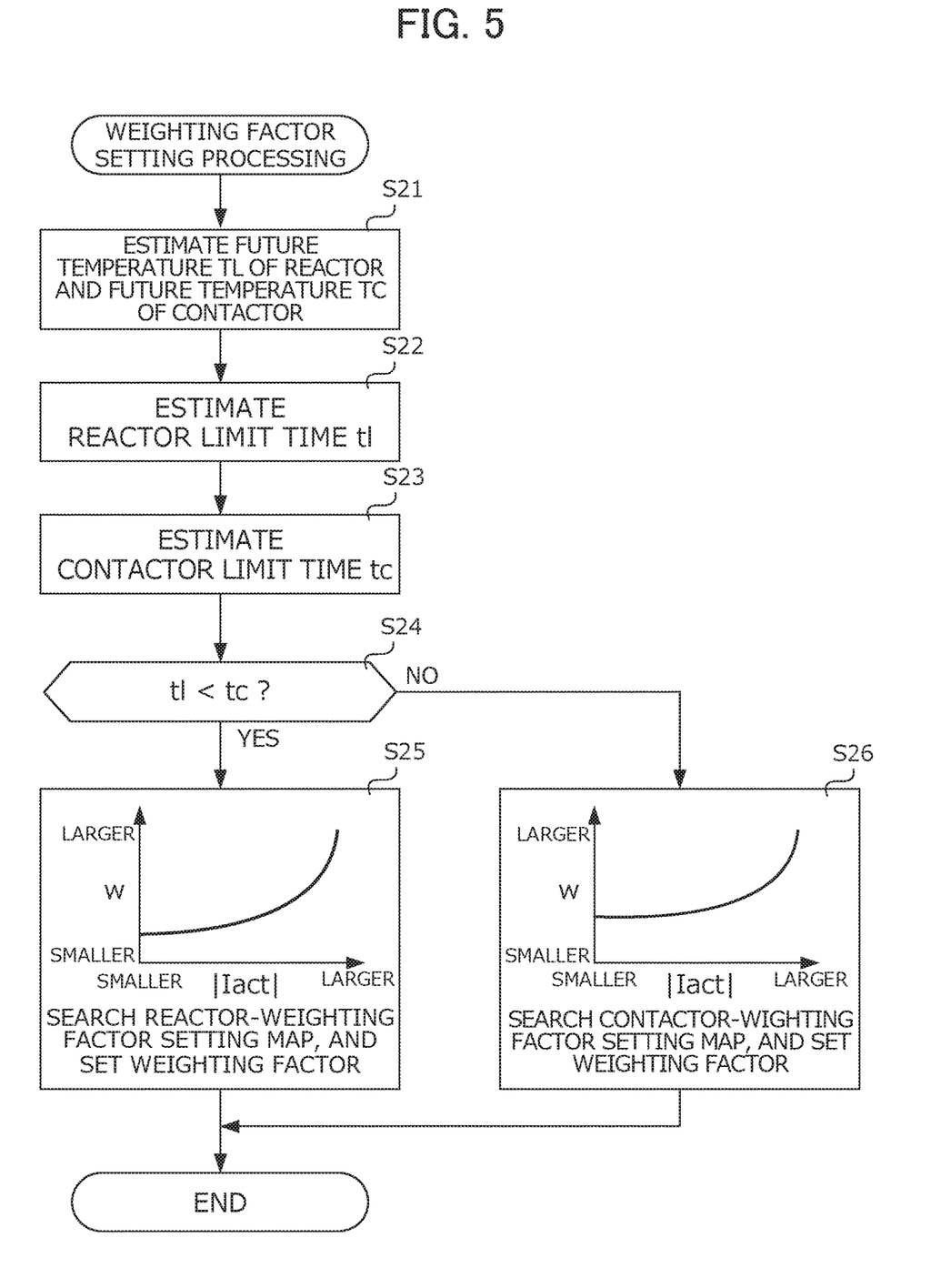
FIG. 5 is a flowchart showing the specific sequence of weighting factor setting processing.

FIG. 5 is a flowchart showing the specific sequence of weighting factor setting processing. As explained by referencing FIG. 4, the failure determination unit 73b decides the timing at which determining that the voltage converter 5 failed by using the integrated value S of the passing current value Iact weighted by the weighting factor S, and in the case of determining that the voltage converter 5 failed, executes protection processing to make so that electrical current does not flow to the reactor L or contactors 32p, 32n. For this reason, the failure determination unit 73b can adjust the time from when the passing current value Iact first becomes negative until determining that the voltage converter 5 failed and starting the protection processing of the reactor L and contactors 32p, 32n, by the weighting factor w. In addition, at this time, the protection processing of the reactor L and contactors 32p, 32n preferably starts before any of these electrical components fail. Therefore, the failure determination unit 73b sets the value of the weighting factor w by performing the weighting factor setting processing shown below, so as to determine that the voltage converter 5 failed before any of the reactor L and contactors 32p, 32n fail.

In Step S21, the failure determination unit 73b estimates the changes in the future temperature TL of the reactor L and future temperature TC of the contactors 32p, 32n based on the passing current value Iact, and then advances to Step S22. More specifically, the failure determination unit 73b estimates the time change in the future temperature TL of the reactor L and the future temperature TC of the contactors 32p, 32n, under the assumption that the electrical current of the passing current value Iact continuously flows to this reactor L and contactors 32p, 32n.

Figure 6:
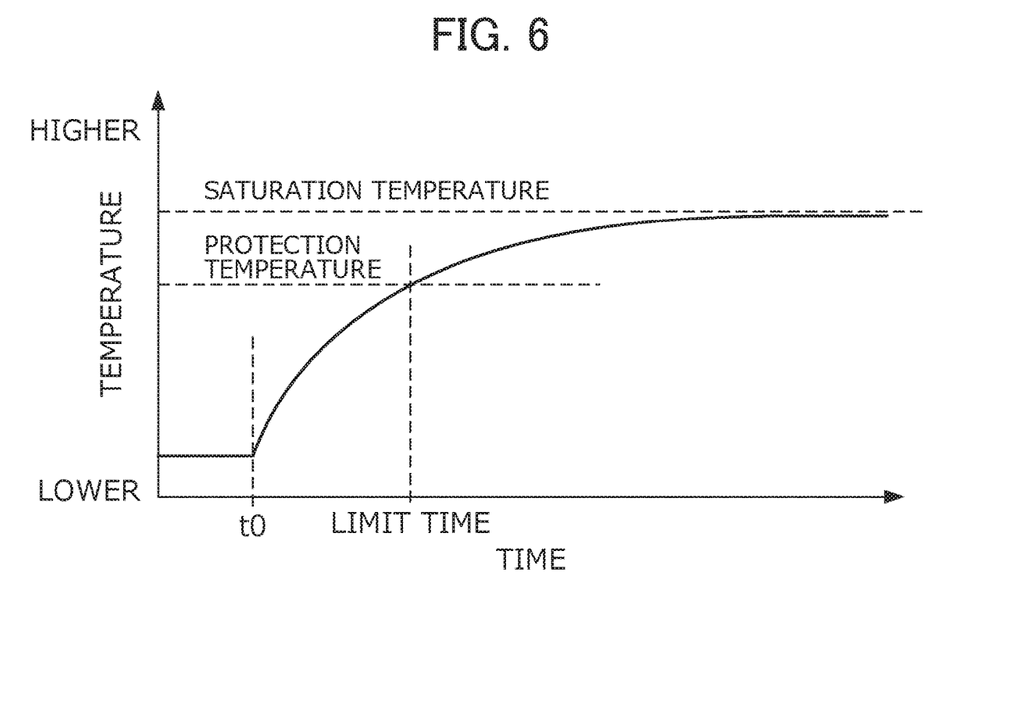
FIG. 6 is a graph showing a typical example of the temperature change in electrical equipment generating heat by Joule loss.

FIG. 6 is a view showing a typical example, for a electrical component that generates heat by Joule loss, as in the reactor L and contactors 32p, 32n, of the temperature change in the case of electrical current of a predetermined value continuously flowing from time t0.

The temperature change in the case of electrical current of a predetermined value continuously flowing in the electrical component can typically be expressed by a first-order delay transfer function characterized by a predetermined saturation temperature and predetermined time constant, as shown in FIG. 6. The failure determination unit 73b estimates the time change of the future temperatures TL, TC of the reactor L and contactors 32p, 32n using this. Herein, saturation temperature can be estimated based on the passing current value Iact, the coolant temperature flowing in the cooling circuit that cools the reactor L and contactors 32p, 32n, and the like. In addition, as the time constant, a constant identified by performing testing in advance for every reactor L and contactor 32p, 32n can be used.

Referring back to FIG. 5, in Step S22, the failure determination unit 73b estimates a reactor limit time tl, which is a time at which the future temperature TL of the reactor L exceeds the reactor protection temperature determined in advance, using the estimation results of Step S21, and then advances to Step S23. In other words, when the temperature of the reactor L exceeds the reactor protection temperature, the possibility of the reactor L failing rises.

In addition, in Step S23, the failure determination unit 73b estimates the contactor limit time tc which is the time at which the future temperature TC of the contactors 32p, 32n exceeds the contactor protection temperature determined in advance, using the estimation results of Step S21, and then advances to Step S24. In other words, when the temperature of the contactors 32p, 32n exceeds the contactor limit temperature, the possibility of the contactors failing rises.

In Step S24, the failure determination unit 73b determines whether the reactor limit time tl is before the contactor limit time tc (tl<tc?). The determination of Step S24 corresponds to determining whether it is estimated that the reactor L will fail before the contactors 32p, 32n, in the case of assuming the electrical current of passing current value Iact continuously flows to the reactor L and contactors 32p, 32n.

In the case of the determination result of Step S24 being YES, i.e. in the case of determining that the reactor L will fail before the contactors 32p, 32n, the failure determination unit 73b sets the value of the weighting factor w by searching a reactor-weighting factor setting map set in advance according to the electrical current-permitted time characteristic of the reactor L, based on the absolute value of the passing current value Iact (refer to Step S25), and then advances to Step S7 of FIG. 4.

Figure 7:
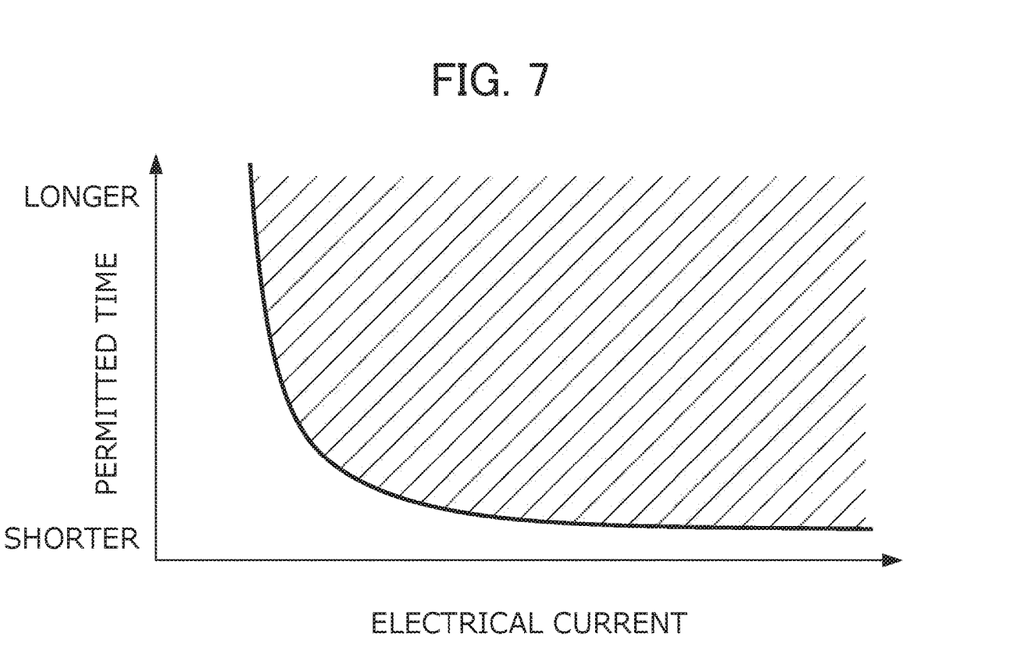
FIG. 7 is a graph showing a typical example of the electrical current-permitted time characteristic of a reactor.

FIG. 7 is a view showing a typical example of the electrical current-permitted time characteristic of the reactor L. In FIG. 7, the horizontal axis shows the magnitude of electrical current flowing through the reactor L, and the vertical axis shows the permitted time. Herein, permitted time corresponds to the time for which continuously flowing electrical current in the reactor L is allowed. In other words, when continuously flowing electrical current over a time within the region shown by the hatching in FIG. 7, there is concern over the reactor L failing. As the aforementioned reactor-weighting factor setting map, a map set based on such an electrical current-permitted time characteristic of the reactor L is used.

In the case of the determination result of the Step S24 being NO, i.e. the case of determining that the contactors 32p, 32n will fail before the reactor L, the failure determination unit 73b sets the value of the weighting factor w by searching a contactor-weighting factor setting map set in advance according to the electrical current-permitted time characteristic of the contactors 32p, 32n, based on the absolute value of the passing current value Iact (refer to Step S26), and then advances to Step S7 of FIG. 4.

According to the above such power supply system 1, the following effects are exerted.

(1) The power supply system 1 connects the first power circuit 2 having the first battery B1 and the second power circuit 3 having the second battery B2 by the voltage converter 5. In such a power supply system 1, there are cases where, when the high-arm element 53H, which is a switching element that connects the first power line 21p of the first circuit 2 and the second power line 31p of the second power circuit 3 in the voltage converter 5, fails ON, negative passing current will flow from the first power circuit 2 side to the second power circuit 3 side, even if being a state of not operating this high-arm element 53H to ON. In the power supply system 1 using this, the failure determination unit 73b determines that the voltage converter 5 failed, in a case of the passing current value Iact becoming negative in a state in which the passing power control unit 73a is not operating the high-arm element 53H of the voltage converter 5 to ON. Consequently, according to the power supply system 1, it is possible to quickly determine failure of the voltage converter 5 immediately after starting up the power supply system 1, i.e. prior to starting the PWM control of the voltage converter 5 by the passing power control unit 73a.

In addition, if the high-arm element 53H of the voltage converter 56 fails ON, and large passing current continuously flows from the first power circuit 2 side to the second power circuit 3 side, the reactor L and contactors 32p, 32n provided to the voltage converter 5 and second power circuit 3 generate heat, and may fail. Therefore, the failure determination unit 53b makes the time from when the passing current value Iact first becomes negative until determining that the voltage converter 5 failed to be shorter as the passing current value increases to the negative side. In other words, the failure determination unit 73b makes the time from when the passing current value Iact first becomes negative until determining that the voltage converter 5 failed to be longer as the passing current value Iact decreases to the negative side. Since it is thereby possible to quickly determine that the voltage converter 5 failed in the case of a large passing current flowing from the first power circuit 2 side to the second power circuit 3 side, before the reactor L and contactor 32p, 32n fail, it is possible to execute protection processing for protecting these. In addition, according to the power supply system 1, in the case of the passing current being relatively small and the possibility of the reactor L1 and contactors 32p, 32n failing immediately being low, since it is possible to secure sufficient time from when the passing current value Iact first becomes negative until determining that the voltage converter 5 failed, misjudgment can be prevented.

(2) The failure determination unit 73b determines that the voltage converter 5 failed in the case of the integrated value S of time of a value obtained by multiplying the weighting factor w by the absolute value of the passing current value Icat reaching a predetermined threshold Sth. It is thereby possible to quickly determine that the voltage converter 5 failed so that the reactor L and contactors 32p, 32n will not fail, in a case of the passing current flowing from the first power circuit 2 side to the second power circuit 3 side being large, and it is possible to ensure sufficient determination time so as to be able to prevent misjudgment in the case of the passing current flowing from the first power circuit 2 side to the second power circuit side 3 being small.

(3) The failure determination unit 73b and second battery ECU 75, in the case of determining that the voltage converter 5 failed, configure so that the electrical current does not flow to the reactor L and contactors 32p, 32n. In a case of the voltage converter 5 failing, and large passing current flowing from the first power circuit 2 side to the second power circuit 3 side, it is thereby possible to prevent this reactor L and contactors 32p, 32n from failing due to heat generation.

(4) The failure determination unit 73b sets the value of the weighting factor w so as to determine that the voltage converter 5 failed prior to any of the reactor L and contactors 32p, 32n failing. In the case of the passing current flowing from the first power circuit 2 side to the second power circuit 3 side due to the voltage converter 5 failing, it is possible to determine that the voltage converter 5 failed prior to the reactor L and contactors 32p, 32n failing due to heat generation, and thus possible to make so that electrical current does not flow to this reactor L and contactors 32p, 32n; therefore, it is thereby possible to prevent the reactor L and contactors 32p, 32n from failing due to heat generation.

(5) When the voltage converter 5 fails and large passing current flows from the first power circuit 2 side to the second power circuit 3 side, the reactor L and contactors 32p, 32n will each generate heat due to Joule loss, and may fail; however, the time of failing differs depending on the electrical current-permitted time characteristic and magnitude of passing current of each. Therefore, the failure determination unit 73b, based on the passing current value Iact, estimates the future temperatures TL, TC of each of the reactor L and contactors 32p, 32n, reactor limit time tl at which the future temperature TL of the reactor L will exceed the protection temperature thereof, and the contactor limit time tc at which the future temperature TC of the contactors 32p, 32n will exceed the protection temperature thereof. Then, the failure determination unit 73b, in the case of the reactor limit time tl being faster than the contactor limit time tc, sets the value of the weighting factor w based on the reactor-weighting factor setting map set according to the electrical current-permitted time characteristic of the reactor L, and in the case of the contactor limit time tc being faster than the reactor limit time tl, sets the value of the weighting factor w based on the contactor-weighting factor setting map set according to the electrical current-permitted time characteristic of the contactors 32p, 32n. The power supply system 1 can thereby adjust the time of determining that the voltage converter 5 failed to match the electrical current permitted-time characteristic of the one estimated to fail earliest among the reactor L and contactors 32p, 32n; therefore, it is possible to determine that the voltage converter 5 failed before any of the reactor L and contactors 32p, 32n fails, and thus possible to prevent electrical current from flowing to this reactor L and contactors 32p, 32n.

Although an embodiment of the present invention has been explained above, the present invention is not limited thereto. The configuration of detailed parts may be modified as appropriate within the scope of the gist of the present invention.

What is claimed is:

1. A power supply system comprising:
a first circuit having a first power source;
a second circuit having a second power source;
a voltage converter which converts voltage between the first circuit and the second circuit;
a power converter which converts electric power between the first circuit and a drive motor;
a current sensor which acquires a passing current value, which is an electrical current value of the voltage converter defining a direction of flow from the second circuit side to the first circuit side as positive;
a control unit which operates the voltage converter; and
a failure determination unit which determines ON failure of a high-arm side switching element of the voltage converter based on the passing current value,
wherein the failure determination unit determines that the high-arm side switching element has failed ON in a case of the passing current value becoming negative in a state in which the control unit is not operating the high-arm side switching element to an ON state; and shortens a time from when the passing current value first becomes negative until determining that the high-arm side switching element failed ON, as the passing current value increases to a negative side.

2. A power supply system comprising:
a first circuit having a first power source;
a second circuit having a second power source;
a voltage converter which converts voltage between the first circuit and the second circuit;
a power converter which converts electric power between the first circuit and a drive motor;
a current sensor which acquires a passing current value, which is an electrical current value of the voltage converter defining a direction of flow from the second circuit side to the first circuit side as positive;
a control unit which operates the voltage converter; and
a failure determination unit which determines ON failure of a high-arm side switching element of the voltage converter based on the passing current value,
wherein the failure determination unit determines that the high-arm side switching element has failed ON in a case of the passing current value becoming negative in a state in which the control unit is not operating the high-arm side switching element to an ON state; and shortens a time from when the passing current value first becomes negative until determining that the high-arm side switching element failed ON, as the passing current value increases to a negative side, and
wherein the failure determination unit determines that the high-arm side switching element failed ON in a case of a time integrated value of a value obtained by multiplying a weighting factor of a predetermined value by the passing current value reaching a predetermined threshold.

3. The power supply system according to claim 1, further comprising:
a first electrical component and a second electrical component which are provided to the second circuit or the voltage converter; and
a protection device which configures so that electrical current does not flow to the first electrical component and the second electrical component, in a case of the failure determination unit determining that the high-arm side switching element failed ON.

4. The power supply system according to claim 2, further comprising: a first electrical component and a second electrical component which are provided to the second circuit or the voltage converter; and
a protection device which configures so that electrical current does not flow to the first electrical component and the second electrical component, in a case of the failure determination unit determining that the high-arm side switching element failed ON,
wherein the failure determination unit sets the value of the weighting factor so s to determine that the high-arm side switching element failed ON before any of the first electrical component and the second electrical component fail.

5. The power supply system according to claim 4, wherein the failure determination unit estimates a future temperature of each of the first electrical component and the second electrical component based on the passing current value, a first time which is a time in which the future temperature of the first electrical component exceeds a protection temperature thereof, and a second time which is a time in which the future temperature of the second electrical component exceeds a protection temperature thereof; sets the value of the weighting factor by searching a first map set according to a characteristic of the first electrical component based on the passing current value in a case of the first time being earlier than the second time; and sets the value of the weighting factor by searching a second map set according to a characteristic of the second electrical component based on the passing current value, in a case of the second time being earlier than the first time.

6. The power supply system according to claim 2, further comprising:
   a first electrical component and a second electrical component which are provided to the second circuit or the voltage converter; and
   a protection device which configures so that electrical current does not flow to the first electrical component and the second electrical component, in a case of the failure determination unit determining that the high-arm side switching element failed ON.

7. The power supply system according to claim 1, wherein the time from when the passing current value first becomes negative until determining that the high-arm side switching element failed ON is utilized to determine start of protection processing.

8. The power supply system according to claim 7, wherein the time from when the passing current value first becomes negative until determining that the high-arm side switching element failed ON is made longer as the passing current value decreases to the negative side.

\* \* \* \* \*